US008227372B2

(12) United States Patent
Lopez et al.

(10) Patent No.: US 8,227,372 B2
(45) Date of Patent: Jul. 24, 2012

(54) CORE / SHELL-TYPE CATALYST PARTICLES COMPRISING METAL OR CERAMIC CORE MATERIALS AND METHODS FOR THEIR PREPARATION

(75) Inventors: Marco Lopez, Frankfurt (DE); Michael Lennartz, Frankfurt (DE); Dan V. Goia, Potsdam, NY (US); Carsten Becker, Niedernberg (DE); Stéphanie Chevalliot, Ancemont (FR)

(73) Assignee: Umicore AG & Co. KG, Hanau-Wolfgang (DE)

( * ) Notice: Subject to any disclaimer, the term of this patent is extended or adjusted under 35 U.S.C. 154(b) by 0 days.

(21) Appl. No.: 12/438,984

(22) PCT Filed: Aug. 27, 2007

(86) PCT No.: PCT/EP2007/058890
§ 371 (c)(1),
(2), (4) Date: Dec. 22, 2009

(87) PCT Pub. No.: WO2008/025751
PCT Pub. Date: Mar. 6, 2008

(65) Prior Publication Data
US 2010/0092841 A1   Apr. 15, 2010

Related U.S. Application Data

(60) Provisional application No. 60/841,156, filed on Aug. 30, 2006.

(51) Int. Cl.
H01M 4/88 (2006.01)
H01M 4/02 (2006.01)
H01M 4/36 (2006.01)
H01M 4/90 (2006.01)
H01M 4/92 (2006.01)
H01M 4/94 (2006.01)
B21D 51/16 (2006.01)
B01D 50/00 (2006.01)
B01D 53/34 (2006.01)
B01J 21/18 (2006.01)
B01J 23/00 (2006.01)
B01J 23/40 (2006.01)
B01J 23/74 (2006.01)
B32B 27/02 (2006.01)
B32B 5/16 (2006.01)
B32B 15/02 (2006.01)
B32B 17/02 (2006.01)
B32B 19/02 (2006.01)
B32B 21/02 (2006.01)
B32B 23/02 (2006.01)

(52) U.S. Cl. ....... 502/182; 502/101; 502/185; 429/523; 429/524; 429/525; 429/526; 429/527; 429/528; 428/403; 422/177; 29/890

(58) Field of Classification Search .................. 502/101, 502/182, 185; 429/523–528; 428/403
See application file for complete search history.

(56) References Cited

U.S. PATENT DOCUMENTS

| 5,489,563 | A | 2/1996 | Brand | |
|---|---|---|---|---|
| 6,007,934 | A | 12/1999 | Auer | |
| 6,045,925 | A | 4/2000 | Klabunde et al. | |
| 6,165,635 | A | 12/2000 | Auer | |
| 6,350,408 | B1 | 2/2002 | Dye | |
| 6,689,505 | B1 | 2/2004 | Albers | |
| 6,861,387 | B2 | 3/2005 | Ruth | |
| 7,052,777 | B2 * | 5/2006 | Brotzman et al. | 428/570 |
| 7,053,021 | B1 | 5/2006 | Zhong et al. | |
| 7,205,255 | B2 * | 4/2007 | Yamamoto | 502/101 |
| 7,534,737 | B2 * | 5/2009 | Gajda | 502/60 |
| 7,691,780 | B2 * | 4/2010 | Adzic et al. | 502/339 |
| 7,709,413 | B2 * | 5/2010 | Yoshida et al. | 502/313 |
| 7,855,021 | B2 * | 12/2010 | Adzic et al. | 429/424 |
| 7,902,104 | B2 * | 3/2011 | Kalck et al. | 502/66 |
| 2002/0146614 | A1 * | 10/2002 | Norskov et al. | 429/44 |
| 2003/0039857 | A1 | 2/2003 | Zhang et al. | |
| 2006/0093892 | A1 | 5/2006 | Min | |

(Continued)

FOREIGN PATENT DOCUMENTS

CN    1358596 A    7/2002
EP    1568427 A    8/2005

(Continued)

OTHER PUBLICATIONS

Zhang J., Lima F.H.B., Shao M.H., Sasaki K., Wang J.X., Hanson J., Adzic R.R., "Platinum monolayer on nonnoble metal-noble metal core-shell nanoparticle electrocatalysis for O2 reduction" J. Physical Chem. B, v. 109, Nov. 11, 2005, pp. 22701-22704.
PCT International Search Report for PCT/EP2007/058889, dated Dec. 28, 2007.
Hachem C., Bocquillon F., Zahraa O. and Bouchy M.: "Decolourization of textile industry wastewater by the photocatalytic degradation process" Dyes and Pigments, vol. 49, 2001, pp. 117-125.

(Continued)

Primary Examiner — Patricia L Hailey
(74) Attorney, Agent, or Firm — Levin Santalone LLP; John Santalone

(57) ABSTRACT

The invention is directed to core/shell type catalyst particles comprising a $M_{core}/M_{shell}$ structure with $M_{core}$=inner particle core and $M_{shell}$=outer particle shell, wherein the medium diameter of the catalyst particle ($d_{core+shell}$) is in the range of 20 to 100 nm, 5 preferably in the range of 20 to 50 nm. The thickness of the outer shell ($t_{shell}$) is about 5 to 20% of the diameter of the inner particle core of said catalyst particle, preferably comprising at least 3 atomic layers. The inner particle core ($M_{core}$) of the particles comprises metal or ceramic materials, whereas the material of the outer shell ($M_{shell}$) comprises precious metals and/or alloys thereof. The core/shell type catalyst particles are preferably supported on suitable support materials such as carbon black and can be used as electrocatalysts for fuel cells and for other catalytic applications.

17 Claims, No Drawings

U.S. PATENT DOCUMENTS

| | | | |
|---|---|---|---|
| 2006/0134505 A1 | 6/2006 | Wang | |
| 2006/0135359 A1* | 6/2006 | Adzic et al. | 502/326 |
| 2007/0105005 A1* | 5/2007 | Tolmachev | 429/44 |
| 2010/0216632 A1 | 8/2010 | Adzic | |

FOREIGN PATENT DOCUMENTS

| | | |
|---|---|---|
| JP | 2005 240088 A | 9/2005 |
| WO | 99/07502 A | 2/1999 |
| WO | 03/070810 A | 8/2003 |
| WO | 2004/052998 A | 6/2004 |
| WO | 2008/025750 A | 3/2008 |
| WO | 2008/025751 * | 3/2008 |

OTHER PUBLICATIONS

PCT International Search Report for PCT/EP2007/058890, dated Jan. 14, 2008.

PCT International Written Opinion for PCT/EP2007/058889, dated Dec. 28, 2007.

PCT International Written Opinion for PCT/EP2007/058890, dated Jan. 14, 2008.

R.K. Roy, et al., "Deposition of continuous platinum shells on gold nanoparticles by chemical precipitation," Journal of Colloid and Interface Science, vol. 369 (2012), pp. 91-95.

* cited by examiner

CORE / SHELL-TYPE CATALYST PARTICLES COMPRISING METAL OR CERAMIC CORE MATERIALS AND METHODS FOR THEIR PREPARATION

The present invention is directed towards advanced core/shell type catalyst particles for use as electrocatalysts in fuel cells, particularly in PEM fuel cells. The catalyst particles are characterized by a core/shell structure with precious metal or a precious metal based alloy in the surface layer (the "shell") and a metal or ceramic material in the inner layer (the "core"). The material in the core comprises a precious metal, a base metal and/or alloys thereof or a ceramic material, the material in the shell comprises precious metal. The medium diameter of the catalyst particles is in the range of 20 to 100 nm; preferably the catalyst particles are supported on a support material, such as conductive carbon black.

The core/shell type catalyst particles, particularly the particles with a Pt-based shell, reveal a high specific activity. As an advantage, they possess a low precious metal content due to the core/shell structure. The catalyst particles are characterized by a high specific mass activity ("SMA") and an improved performance in oxygen reduction reactions ("ORR") at the cathode of membrane fuel cells, such as PEMFC (Polymer electrolyte membrane fuel cells) or DMFC (Direct methanol fuel cells). They are designed for use as electrocatalysts in fuel cells, predominantly in mobile applications.

However, they may also be used in other applications, such as, e.g., in gas-phase catalysis or in catalytic converters for automobiles.

Fuel cells are gaining increased importance as mobile, stationary or portable power sources. In principle, fuel cells are gas-operated batteries, in which the chemical energy obtained from the reaction of hydrogen and oxygen is converted directly into electrical energy.

Electrocatalysts based on platinum (Pt) are routinely used on the anode and cathode side of PEM fuel cells. They comprise finely divided precious metal particles deposited on a conductive support material (generally carbon black or graphite). Normally, the concentration of precious metal is in the range from 20 to 60 wt.-%, based on the total weight of the catalyst.

In order to accelerate the commercialization of PEMFC technology, a significant reduction of precious metals such as platinum must be achieved. At the same time, the specific activity of the currently used electrocatalysts must be improved.

Due to the slow oxygen reduction kinetics, cathode Pt-loadings in MEAs for PEMFC are still relatively high and in the range of ~0.4 mgPt/cm$^2$ to meet the energy efficiency targets. These efficiency targets are reported in the literature as follows (ref to M. F. Mathias et al., The Electrochemical Society-Interface; Fall 2005, pages 24-35):

| | |
|---|---|
| Cell voltage | >0.65 V |
| MEA power density | >0.9 W/cm$^2$ |
| Specific power densities | ~0.5 gPt/kW |
| Specific mass activity (cathode catalyst): | >440 A/gPt |

These targets result in catalyst costs of ~$18/kW (assuming $35/gPt for a supported Pt/C catalyst) and do not meet the stringent automotive cost requirements of <$10/kW, which is equivalent to a Pt consumption of <0.2 gPt/kW. While clearly the Pt cathode loading must be reduced to the level of 0.1 mgPt/cm$^2$ in order to meet the <0.2 gPt/kW target, this would lead to a 40 mV loss in cell voltage, which is not acceptable for efficiency reasons.

Based on these considerations, there is a need for improved cathode electro-catalysts with a fourfold enhanced activity to improve the overall power density towards the target of >0.9 W/cm$^2$. In addition to that, the catalyst has to survive load cycling with >300,000 voltage cycles between 0.6-1.1 V as a consequence of the dynamic operation of a car. With the electrocatalysts currently available, this load cycling leads to a significant loss of platinum and to metal particle sintering. As a consequence, dramatic losses of catalyst activity and performance occur with the electrocatalysts state of the art (ref to M. F. Mathias et al., cited above).

The standard electrocatalysts currently applied in PEMFC cathodes are based on Pt or Pt-alloys (e.g. Pt/Co, Pt/Ni or Pt/Cr) supported on conductive carbon black. These catalysts have been designed towards very high metal surface areas (measured as electrochemical surface area "ECA" in m$^2$/gPt) to maximize the utilization of each metal atom at the particle surface.

State of the art catalysts comprise 20 to 60 wt.-% Pt on a high surface area carbon black support and reveal metal surface areas (ECA) in the range of 80 to 120 m$^2$/gPt with a medium particle size (determined by TEM) below 3 nm. Specific activities ("SA") of these electrocatalysts are in the range of 0.15 to 0.2 mA/cm$^2$Pt [measured in a PEM single cell at standard operating conditions; i.e. cell voltage 0.9 V, temperature 80° C., pressure 150 kPa and full humidification].

In order to compare mass-related cost/performance aspects of different catalysts, the specific activity must be converted into the specific mass activity ("SMA" in mA/mgPt or A/gPt). When employing the ECA value given above, one obtains figures for the SMA in the range of 90-120 A/gPt for the electrocatalysts currently available on the market. Given the fourfold performance requirement needed, this would require SMA's of 360-480 A/gPt for advanced electrocatalysts.

When using various Pt-alloys (such as Pt/Cr, Pt/Co or Pt/Ni), it has been demonstrated that an increase of the specific activity (SA) by the factor of 2-4 compared to pure Pt can be achieved (ref to V. R. Stamenkovic et al., J. Am. Chem. Soc. 2006, volume 128, 8813-8819). However, this improvement alone is still not sufficient to meet the cost requirements of the automotive industry.

Considerable work has been conducted in the past to understand the influence of particle size effects on electrocatalyst performance. A comparison of standard Pt/C catalysts with different medium particle sizes shows an increase in activity with increasing particle size from 1 to 30 nm (RDE-measurements in 0.1M HClO$_4$; ref to P. N. Ross et al, Presentation "New electrocatalysts for fuel cells"; Project ID #FC10; DOE 2005). However, electrocatalysts comprising solid, uniform Pt particles with 30 nm medium size reveal very low values for the specific mass activity (SMA) due to the fact that most of the platinum is buried inside the particle and cannot be utilized for the catalytical reaction. As a consequence, solid catalyst particles with relatively coarse medium particle sizes lead to a higher Pt consumption, a lower electrochemical Pt surface area and thus result in low Pt utilization.

It is well known in the art, that only the surface of a catalyst promotes the catalytic reaction and the inside core does not contribute to the reactivity of the individual catalyst particle. Thus, it should be possible to further reduce the amount of platinum by having it present in a shell at the particle surface. Catalysts of this type are known as core/shell catalysts. Over the past years, such electrocatalysts were described in the literature.

J. Zhang et al. reported the preparation of core/shell particles as electrocatalysts for oxygen reduction. The core comprises an alloy of a precious metal, whereas the shell consists of a Pt monolayer deposited by under potential deposition ("UPD"); ref to J. Zhang, F. H. B Lima et al, Journal of Physical Chemistry B Letters, 2005, 109, 22701-22704. The catalyst thus obtained is a $Pt_{ML}X/C$ (X=Au, Ag, Pd; ML=monolayer) with the metal particles comprising an inner core consisting of metal X and a monolayer of platinum in form of a shell on top of it.

Core/shell catalysts comprising a ruthenium core coated with platinum were described some years ago (ref to S. R. Brankovitch, J. X. Wang and R. R. Adzic, Electro-chemical and Solid State Letters 2001, 4, A 217). The medium particle size of the Ru/Pt core/shell particles is in the range of 2.5 nm (by TEM).

U.S. Pat. No. 7,053,021 teaches the preparation of carbon-supported core/shell nano-particles of 1-3 nm size comprising a platinum-vanadium-iron alloy. An improvement by the factor of 2-4 is reported. Again, this improvement is still not sufficient to meet the targets of the automotive industry.

In summary, the electro catalyst presently state of the art are not sufficient to meet the performance and cost requirements for the widespread commercial introduction of fuel cell technology.

BRIEF DESCRIPTION OF THE INVENTION

It is one objective of the present invention to provide improved catalyst particles and catalyst materials with high specific mass activity (SMA), low precious metal content and high durability, particularly for fuel cell applications.

A further objective of the present invention is to provide a method for manufacturing of these catalyst particles and catalyst materials.

These objectives are achieved by the materials and processes described in the claims of the present invention.

The present invention is based on the principle of a core/shell structure in combination with the characteristics of a polycrystalline, bulk precious metal surface preferably Pt). Thus, core/shell based catalyst particles are provided, in which the particle shell is big enough to show the characteristics of polycrystalline, bulk precious metal (e.g. platinum) and at the same time the particle core does not contain the precious metal present in the shell (preferably Pt).

By tailoring the catalyst particle surface towards the characteristics of polycrystalline bulk Pt, a markedly increased specific activity can be obtained. In order to achieve the characteristics of a bulk Pt surface, the particle should have the following features:
a) a certain medium size (diameter), which is well above the size of the currently used Pt nanoparticles and
b) a certain thickness of the outer shell. The thickness of the particle shell ($t_{shell}$) should be about 5 to 20%, preferably about 5 to 10% of the diameter of the inner particle core ($d_{core}$). The outer particle shell should further comprise at least 3 atomic layers of platinum atoms. In the case of Pt-based alloys, the shell should comprise at least 3 atomic layers of platinum atoms including the atoms of the alloying element(s).

DETAILED DESCRIPTION OF THE INVENTION

In the following, the characteristics of the catalyst particles according to the present invention are described in more detail.

The core/shell catalyst particles of the present invention are characterized by the general structure $M_{core}/M_{shell}$ wherein
$M_{core}$=material of the particle core
$M_{shell}$=material of the particle shell
$M_{core}$ (the material of the particle core) may comprise base metals (i.e. non-precious metals), precious metals and/or mixtures or alloys thereof. Suitable base metals are taken from the group of transition metals of the Periodic System of Elements (PSE). Examples are aluminium (Al), titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), tantalum (Ta), tin (Sn), tungsten (W) and rhenium (Re) and/or mixtures or alloys thereof. Furthermore, $M_{core}$ may comprise precious metals or precious metal-containing alloys. Examples for precious metals are ruthenium (Ru), osmium (Os), rhodium (Rh), iridium (ir), palladium (Pd), platinum (Pt), silver (Ag) and gold (Au). Examples for suitable $M_{core}$ alloys comprising precious metals only are Ag/Au or Ag/Pd. Examples for suitable $M_{core}$ alloys comprising precious metals and base metals are Ag/Cu or Ag/Sn.

Furthermore, $M_{core}$ (the material of the particle core) may comprise ceramic materials. Examples for ceramic materials are inorganic oxides such as alumina ($Al_2O_3$), zirconia ($ZrO_2$), titania ($TiO_2$), tin dioxide ($SnO_2$) or ceria ($Ce_2O_3$ and/or $CeO_2$). Additionally, mixed inorganic oxides (e.g. $MgO/SiO_2$, $CaO/Al_2O_3/SiO_2$), perowskites (e.g. Ba—$TiO_3$), spinels (e.g. $MgAl_2O_4$, $CoAl_2O_4$), stabilized inorganic oxides (e.g. $Y_2O_3$—$ZrO_2$, $La_2O_3$—$ZrO_2$) or doped inorganic oxides with dopants Ce, Ti, La, Nb, Ta or fluorine (e.g. $Ce/ZrO_2$, $SnO_2(F)$) can be used. Inorganic nitrides (e.g. BN) may be employed as well.

$M_{shell}$ (the material of the particle shell) comprises precious metals selected from the group consisting of ruthenium (Ru), osmium (Os), rhodium (Rh), iridium (Ir), palladium (Pd), platinum (Pt), silver (Ag) and gold (Au) and alloys or mixtures thereof. Preferably, platinum (Pt) or platinum and ruthenium (Pt/Ru) is used. Furthermore, platinum alloys with base metals such as nickel (Pt/Ni), chromium (Pt/Cr), cobalt (PtCo) or copper (PtCu) may also be used as particle shell. Ternary alloys may also be used (e.g. PtRuW).

The individual catalyst particles are characterized by a medium diameter ($d_{core+shell}$) in the range of 20 to 100 nm, preferably in the range of 20 to 50 nm and more preferably in the range of 20 to 40 nm:

$$d_{core+shell}=20 \text{ to } 100 \text{ nm}$$

As will be outlined later, a considerable reduction of the Pt content in the catalyst particle can be obtained with shell Pt layers having a specific minimum thickness. The Pt-based shell layer must have a certain thickness in order to establish the polycrystallinity/bulk effects at the particle surface. The thickness of the outer particle shell($t_{shell}$) should be about 5 to 20%, preferably about 5 to 10% of the diameter of the inner particle core ($d_{core}$):

$$t_{shell}\approx 0.05 \text{ to } 0.2 \, d_{core}$$

wherein $$t_{shell}=(d_{core+shell}-d_{core})/2.$$

The thickness of the outer particle shell ($t_{shell}$) should be in the range of about 1 to 20 nm, preferably in the range of about 1 to 10 nm, more preferred in the range of about 1 to 8 nm and most preferred in the range of about 1 to 3 nm. The outer particle shell should further comprise at least 3 atomic layers of platinum atoms. In the case of Pt-based alloys, it should comprise at least 3 atomic layers of platinum atoms including the atoms of the alloying element(s). Thinner layers, particularly thin Pt monolayers, do not lead to the desired increase of specific activity.

Electrochemical investigations have shown that the specific activity (SA) in the oxygen reduction reaction (ORR) for polycrystalline, bulk Pt is about the factor of 5 to 6 higher compared to standard Pt/C electrocatalysts:

Specific activity (bulk Pt): 1.2 mA/cm$^2$Pt (=12 A/m$^2$Pt)

Specific activity (50 wt.-% Pt/C): 0.15-0.2 mA/cm$^2$Pt (=1.5-2 A/m$^2$Pt)

For a supported cathode catalyst (50 wt.-% Pt/C) with an ECA of 80 m$^2$/g and a medium particle size of 3 nm, the specific mass activity is given by:

Specific mass activity (SMA): 120-160 A/g Pt

According to recent results, Pt particles of 20 nm medium particle size deliver about 50% of the specific activity of polycrystalline, bulk Pt (i.e. ~0.6 mA/cm$^2$Pt). These particles are showing an Electrochemical surface area (ECA) of 9 m$^2$/g Pt. Thus, the specific mass activity results in 54 A/gPt, which is only 33% of the mass activity of a standard 50 wt.-% Pt/C catalyst. A similar result is obtained for Pt particles with 30 nm medium particle size, which keep 70% of the bulk specific activity resulting in 0.8 mA/cm$^2$Pt (8 A/m$^2$Pt). Given the ECA of 6 m$^2$/gPt, this results in a mass activity of 48 A/gPt, which is only 30% of the activity of Pt/C catalyst (ref to Karl J. J. Mayrhofer, Ph. D. Thesis, Vienna University of Technology, Chapter 4.5, 96-102, Vienna, December 2005).

When applying the core/shell principle to these electrocatalysts, the specific mass activity is increased by reducing the amount of Pt in the particles:

By concentrating the Pt in a shell of at least 3 atomic layers (thickness $t_{shell}$ at least 1 nm) at the surface of a 20 nm core/shell particle, a reduction of the platinum mass content by about 70% based on the weight of the corresponding massive Pt particle can be obtained. Thus, the Pt mass content is only 30% of the weight of the corresponding massive Pt particle and the specific mass activity (SMA) increases theoretically by a factor of 3.3. This results in a SMA of 180 A/gPt.

For a 30 nm particle with a Pt shell thickness of $t_{shell}$=1 nm, a reduction of the Pt mass content by about 80% based on the weight of the corresponding massive Pt particle can be obtained. This would result in a specific mass activity (SMA) of 240 A/gPt (for a 20% Pt mass content). The reduction of the platinum mass content of the particle depends on the thickness of the outer particle shell ($t_{shell}$) and is generally higher than 40%, preferably higher than 45% and more preferred higher than 50%. Core/shell-catalyst particles with thicker shell layers (thickness $t_{shell} \geq 0.2$ d.) do not lead to the Pt mass reduction required.

When applying Pt-alloys as shell material for such particles (and taking in account the activity improvement by the factor of 2-4 outlined above), the resulting electrocatalysts meet the 4× specific mass activity target of the automotive industry (i.e. >440 A/gPt).

In addition to that, catalyst particles with a medium size of $\geq$20 nm are significantly more stable towards sintering, Pt-leaching and Ostwald-ripening in ageing tests based on dynamic voltage cycling. Thus they reveal a higher durability.

The catalyst particles comprising the $M_{core}/M_{shell}$ structure described above are preferably supported on a suitable support material. Suitable support materials are high surface area powdered materials, such as inorganic oxides, carbon blacks, graphite or polymers. Preferably, electrically conductive support materials are used. Preferred support materials are high surface area electrically conductive carbon blacks, high surface area graphite, carbon nanotubes, high surface area conductive oxides or polymers. Suitable carbon blacks are for example Vulcan XC 72, Ketjenblack EC or Shawinigan Black, which are commercially available from different suppliers.

The amount of catalyst particles when supported on the electrically conductive support material (hereinafter called the "catalyst particle loading") is generally in the range of 5 to 90 wt.-%, preferably in the range of 10 to 80 wt.-% and most preferred in the range of 20 to 70 wt.-% (based on the total weight of the resulting electrocatalyst).

In a first embodiment of the present invention, the catalyst particles are based on a core/shell structure comprising a base or precious metal core and a shell comprising platinum.

In a second embodiment of the present invention, the catalyst particles are based on a core/shell structure comprising a base or precious metal core and a Pt-alloy shell. In the present application, the term "Pt-alloy" is to be interpreted in a very broad sense, i.e. also including homogeneous mixtures, heterogeneous mixtures, Pt doped with additional atoms, semi-alloys, partially alloyed states, segregated states etc). The shell may comprise, as example, platinum alloys with nickel (Pt/Ni), chromium (Pt/Cr), cobalt (PtCo), ruthenium (Pt/Ru) or copper (PtCu). The Pt alloys can be in disordered or an ordered state, such as e.g. Pt$_3$Co or Pt$_3$Cr. Ternary alloys may also be used (e.g. PtRuW). Again, the catalyst particles are characterized by a medium size (diameter) in the range of 20 to 100 nm, preferably in the range of 20 to 50 nm and more preferably in the range of 20 to 40 nm.

In a third embodiment of the present invention, the Pt-alloy of the shell comprises the base metal of the core. Examples for such compositions are Ni/PtNi, Ni/PtCo or Cu/PtRuCu. The Pt alloys can be in an ordered state, such as e.g. Pt$_3$Ni or Pt$_3$Co. The Pt-alloys of the shell may be prepared in these cases by suitable heat treatment procedures.

In a further embodiment of the present invention, the catalyst particles are based on a core/shell structure comprising a ceramic core and a shell comprising precious metal or precious metal based alloys. Examples for such compositions are ZrO$_2$/Pt, CeO$_2$/Pt, Ce/ZrO$_2$/Pt, ZrO$_2$/PtRu or ZrO$_2$/Pt/Ni.

The core/shell catalyst particles can be prepared in a multistage process using suitable core particles as starting material. Usually, a step-wise process is used, consisting of the preparation of the core particles in the first step and applying the shell material in the second step. A heat treatment process to prepare a special structure of the shell can be optionally employed as a third step. A fourth step may be added to support the core/shell particles on a suitable support material. Alternatively, the core particles may be prepared in a supported stage in the first step and subsequently coated with the shell material in the second step.

In a further alternative process, the core particles are prepared in the first step and then simultaneously coated and supported on a support material in the second step. In this method, the outer particle shell ($M_{shell}$) is applied to the material of the inner particle core ($M_{core}$) in the presence of said support material.

This method is advantageous in terms of scalability, processing time and cost.

For the preparation of the metallic core particles ($M_{core}$=metal) of the present invention, preferably wet chemical reduction methods are applied, which are well known to the person skilled in the art. Aqueous media are preferred, but not required. As an example, the nickel core particles can be prepared by a polyol reduction process in presence of a stabilizer and (optionally) a carbon black support.

For the preparation of the ceramic core particles ($M_{core}$=ceramic), suitable methods published in the literature can be used. For example, nano-sized zirconia ($ZrO_2$) can be obtained by the method described by H. Yue-xiang and G. Cun-ji, Powder Technology, 1992, 72, pages 101-104. Spherical, nano-sized ceria particles ($CeO_2$) are obtainable by a method described by D. Andreescu et al., Colloids and Surfaces A: Physico-chem. Eng. Aspects, 2006, 291, pages 93-100. Suitable nano-sized ceramic materials are furthermore available from various commercial sources (e.g. Sumitomo Osaka Cement Co. Ltd., Tokyo, Japan).

The particle shell ($M_{shell}$) may be prepared also by wet chemical reduction techniques. However, alternative technologies suitable for metal coating of fine particles are suitable; examples are electroplating, cementation, transmetallation, UPD, plasma coating, vapour deposition, physical vapour deposition (PVD), chemical vapour deposition (CVD) or atomic layer deposition (ALD) methods. Suitable platinum alloys can be prepared by employing simultaneous or consecutive precipitation processes.

In a preferred method, the particle shell ($M_{shell}$) may be prepared in the second step by employing a colloidal dispersion of precious metal particles (precious metal "colloids" with particle sizes of about 2 to 5 nm). Such colloidal dispersions are prepared separately and then added to the dispersion of the core particles. Hereby, the small colloidal particles deposit on the surface of the metal or ceramic core particles ($M_{core}$). In a further step, a heat treatment procedure or annealing process may be applied to sinter these individually deposited particles together and to form a dense and continuous layer in the shell. In the case of the deposition of several metals in the particle shell, alloy formation can be effected.

Typically, the heat treatment procedure or annealing process is conducted at temperatures in the range of 200 to 500° C. for 0.5 to 2 hours. Inert, reducing, oxidizing or protective atmospheres (e.g. nitrogen, forming gases and argon) can be used.

Supported core particles or supported core/shell particles can be prepared by methods and procedures known from the preparation of carbon black supported electro-catalysts as described for example in the patents U.S. Pat. Nos. 6,861,387, 6,689,505, 6,165,635, 6,007,934 and U.S. Pat. No. 5,489,563 of the assignee of the present invention.

For electrochemical testing of the catalyst particles, standard testing procedures are applied. The specific activity (SA in mA/mgPt) is determined by standard rotating disc electrode (RDE) measurement. In addition, tests in PEM single cells at standard operating conditions can be performed.

The invention is explained in more detail by the following examples, which are considered illustrative, but not limiting.

EXAMPLE 1 a) Preparation of Ag Core Particles 19.85 g of polysaccharide gum (Merck) are dispersed in 400 ml of deionised (DI) water for 1 hour. Next, 11.03 g of sodium hydroxide (NaOH) and 31.25 g silver nitrate (m=169.87 g/mol) are individually dissolved in 50 ml of deionised water. Both solutions are continuously added to the solution of the gum at room temperature within 1 hour. After the addition is completed, the solution is heated to 70° C. for one hour. A silver nanoparticle dispersion containing 19.8 g Ag is obtained. The diameter of the silver particles is about 20 nm (by TEM).

b) Preparation of a Colloidal Dispersion of Pt Particles 400 mg of polysaccharide gum (Merck) are dispersed in 500 ml of deionised (DI) water and stirred for 1 hour with a PTFE-coated 3-blade propeller connected to a variable speed mixer. Next, 1.95 g of platinum as hexachloroplatinic-(IV)-acid solution (7.8 g, 25 wt.-% Pt; Umicore, Hanau/Germany) are added under intensive stirring. After 10 minutes of mixing, 100 ml of a solution of ascorbic acid (Merck) containing 7.05 g of ascorbic acid are added. The pH of the solution is now increased to pH =12 with 10 wt.-% NaOH. After pH 12 is reached, the reaction is diluted with DI water to a final volume of 1,000 ml. Finally, the temperature is increased to 70° C. The platinum is reduced by the ascorbic acid and forms a colloidal dispersion of Pt particles of about 2-3 nm size.

c) Preparation of Ag/Pt Core/Shell Particles 20.1 ml of the Ag nanoparticle dispersion prepared in Example 1a) is diluted to 500 ml with deionised (DI) water. Now, the Pt colloidal dispersion prepared in Example 1b) is added to the diluted Ag nanoparticle solution under intensive mixing. Thereby, the small Pt colloid particles settle on the surface of the ~20 nm Ag nanoparticles. The system is then heated to 83° C. During this stage, the pH is adjusted to ~0.5 by adding 10 ml 12.1 N hydrochloric acid. Next, the reaction mixture is cooled to room temperature and the product is separated from the mother liquor. Finally, the powder is washed 3× with 300 ml of DI water. The damp filter cake is then dried under vacuum. About 2.7 g of Ag/Pt composite particles are obtained.

The composite Ag/Pt material is transferred to a tube furnace and treated for 1 hour at 400° C. under a dry nitrogen atmosphere. A continuous Pt shell is formed during the final heat treatment step.

Particle Characteristics:

| | |
|---|---|
| Medium diameter of Ag core particles (by TEM): | 20 nm |
| Medium diameter of Ag/Pt particles (by TEM) | 26 nm |
| Medium thickness of Pt shell ($t_{shell}$) | ~3 nm |
| Medium thickness of Pt shell (in % of $d_{core}$) | ~15% |
| Pt mass reduction due to core/shell structure | ~45% |

In electrochemical testing by RDE, a high specific mass activity (SMA) is obtained.

EXAMPLE 2 a) Preparation of Au Core Particles 0.204 g gold as 0.885 g solution of tetrachlorogold-(III)-acid ($HAuCl_4$; 23.03 wt.-% Au, Umicore Hanau/Germany) are rinsed into 500 ml of DI water. Next, 290.56 mg of ascorbic acid (Merck) are dissolved in 500 ml of DI water. For the preparation of the gold particles, both solutions are rapidly transferred into one single 2 liter glass beaker. The gold particles are formed almost spontaneously. The diameter of the gold particles is determined by TEM to 25 nm.

b) Preparation of Au/Pt Core/Shell Particles

The gold particles prepared in Example 2a) are used as starting product (204 mg Au/l). First, 7.5 g of a 25 wt.-% hexachloroplatinic-(IV)-acid solution (containing 1.88 g Pt) are added under intensive stirring. Next, 27.12 g of ascorbic acid (Merck) are added. The solution is stirred for 30 min to dissolve the ascorbic acid. Then the pH is adjusted to pH 12 with 10 wt.-% NaOH solution. Finally, the solution is quickly heated to 70° C. to reduce the platinum and to prepare particles with a Pt shell of about 3 nm around the gold particles.

Particle Characteristics:

| | |
|---|---|
| Medium diameter of Au core particles (by TEM): | 25 nm |
| Medium diameter of Au/Pt particles (by TEM) | 30 nm |
| Medium thickness of Pt shell ($t_{shell}$) | ~2.5 nm |
| Medium thickness of Pt shell (in % of $d_{core}$) | ~10% |
| Pt-mass reduction due to core/shell structure: | ~58% |

In electrochemical testing by RDE, a high specific activity is obtained.

EXAMPLE 3 a) Preparation of Au Particles 56.0 g solid tetrachlorogold-(III)-acid ($HAuCl_4$; Umicore, Hanau/Germany; 21.0 g Au) is dissolved in 1,050 ml of deionised (DI) water. The pH of the $HAuCl_4$ solution is adjusted to pH=12 by adding 68.88 g of 10 wt.-% NaOH. Finally, a solution of 15.75 g polysaccharide gum (Merck), previously dissolved in 210 ml of deionised (DI) water is added. The addition of polysaccharide gum is followed by the addition of a mixture of 33.74 g ascorbic acid (Merck) and 5.25 g polysaccharide gum (Merck) dissolved in 455 ml of DI water within 50 minutes under intensive mixing. The pH drops during the formation of gold particles and a red brown dispersion of gold particles of an average diameter of 50 nm is obtained.

b) Preparation of Au/Pt Core Shell Particles

The gold particle dispersion prepared in example 3a) is used as received. 58.97 g of solid hexachloroplatinic-(IV)-acid (Umicore Hanau/Germany; 23.59 g Pt) is dissolved in the gold-colloid solution and stirred for 10 minutes to ensure complete dissolution. The solution is then heated to 40° C. and 170 g of solid ascorbic acid (Merck) is added under constant stirring. The solution is further heated to 70° C. and kept there for 100 minutes. After the reduction of platinum is completed, 105 ml of concentrated hydrochloric acid is added and the solution is stirred for one additional hour at 85° C. The reaction is allowed to settle over night, the top solution is siphoned and the solids are washed and dried.

The shell is finally created by a heat treatment similar to the procedure described in Example 1. After annealing, Au/Pt core/shell particles are obtained with a thin shell of platinum. Particle Characteristics:

| | |
|---|---|
| Medium diameter of Au core particles (by TEM): | 50 nm |
| Medium diameter of Au/Pt particles (by TEM) | 65 nm |
| Medium thickness of Pt shell ($t_{shell}$) | ~7.5 nm |
| Medium thickness of Pt shell (in % of $d_{core}$) | ~15% |
| Pt-mass reduction due to core/shell structure: | ~45.5% |

In electrochemical testing by RDE, a high specific activity is obtained.

EXAMPLE 4

Preparation of Ag/Pt Particles Supported on Carbon Black 2.7 g of Ag/Pt particles prepared in Example 1c) are re-dispersed in 200 ml of deionized (DI) water using ultrasonication. Next, 6.3 g of carbon black (Ketjenblack EC300J, Akzo Nobel) are dispersed in 800 ml of deionized (DI) water. Now, the dispersion of Ag/Pt core/shell particles is added drop wise to the carbon black dispersion under intensive stirring. The dispersion is heated to 60° C. and kept at that temperature for 2 hours. The resulting core/shell particles are well dispersed and supported on the carbon black to yield an Ag/Pt/C catalyst with about 30 wt.-% catalyst particle loading. Particle size measurement (by TEM) reveals a medium particle size of 26 nm.

Catalyst Characteristics:

| | |
|---|---|
| Medium diameter of Ag core particles (by TEM): | 20 nm |
| Medium diameter of Ag/Pt particles (by TEM) | 26 nm |
| Medium thickness of Pt shell ($t_{shell}$) | ~3 nm |
| Medium thickness of Pt shell (in % of $d_{core}$) | ~15% |
| Pt mass reduction due to core/shell structure: | ~45% |
| Catalyst particle loading on carbon black | ~30 wt.-% Ag/Pt |

In electrochemical testing by RDE, a high specific activity is obtained.

EXAMPLE 5 a) Preparation of Ni Core Particles

The Ni core particles are prepared by a reduction in polyol in the presence of polysaccharide gum (Merck) as stabilizer. Thus, 2.1 g of the stabilizer (pre-dispersed in 50 ml of diethyleneglycol (DEG)) and 2.5 g nickel as 10.6 g nickel-(II) acetate are mixed in 450 ml of DEG in a 113-neck flask and stirred at 500 rpm for 30 min. At this time, the suspension is heated to 220° C. and the temperature is kept until the reduction of Ni is completed. The reaction mixture is cooled to room temperature. An isolated fraction of the mother liquor reveals the presence of Ni nanoparticles with 20 nm medium diameter (measured by TEM).

b) Preparation of Ni/$Pt_3$Co Particles

The reaction mixture of a) is used at the stage of completed reduction of nickel. The suspension is cooled to 40° C. Now, 1.576 g of Pt as hexachloroplatinic-(IV)-acid (25 wt.-% Pt; 6.3 g, Umicore Hanau/Germany) are dissolved in 100 ml of fresh DEG and then added to the mixture. The suspension is stirred for 15 min. Next, 0.158 g cobalt as solid cobalt-(II) acetate is added and the suspension is stirred for 60 min to completely dissolve the cobalt acetate. Finally, the pH is adjusted to pH 6.1 with 10 wt.-% NaOH and the reaction is then heated to reflux (approx. 240° C.) to reduce the platinum and the cobalt. After the reduction of the metals is completed, 200 ml of cold DI water are added below 100° C. and the pH is adjusted to pH =1 with concentrated hydrochloric acid. The reaction is then stirred at 85° C. for 1 hour. The reaction is allowed to settle overnight, the top solution is siphoned and the solid powder is washed and dried. The shell of PtCo is finally created by a heat treatment similar to the procedure described in Example 1. After the annealing, Ni/$Pt_3$Co core/shell particles are obtained with a thin shell of platinum-cobalt.

EXAMPLE 6 a) Preparation of $ZrO_2$ Core-Particles

Nano-scaled zirconia is obtained by the method described by H. Yue-xiang and G. Cun-ji (Powder Technology 1992, 72, 101-104).

12,01 g of urea are dissolved in 1 liter of a 0.2 molar solution of zirconylchlorid-octahydrate ($ZrOCl_2 \times 8 H_2O$) (=18.25 g Zr) a 3-necked beaker. After complete dissolution of the urea, the mixture is heated under reflux for 50 hours. After cooling down to room temperature, the reaction solution is transferred to a dialysis tube to clean the mother liquor from excess of chloride. The dialysis tube is placed in a beaker with 5 liter of deionised (DI) water and the water is exchanged three times within three days. The $ZrO_2$ particles are separated from the liquid, washed with ethanol to remove water, and finally dried in vacuum. Analysis of the $ZrO_2$-particles by TEM shows deagglomerated spherical particles with a medium diameter of 80 nm.

b) Preparation of $ZrO_2$/Pt Core-Shell Particles

The zirconia prepared according to Example 6a) is used without drying after purification. A portion of 5 g of the $ZrO_2$-particles as dispersion is transferred into a 5 liter beaker. The dispersion is filled up to 3 liter with deionised (DI) water and 5.92 g Pt as hexa-chloroplatimic-(IB)-acid (25 wt.-% Pt; 23.68 g; Umicore Hanau/Germany) is added and stirred for 10 minutes to insure complete dissolution. The solution is then heated to 40° C. and 43 g of solid ascorbic acid (Merck) is added under constant mixing. The solution is further heated to 70° C. and kept there for 100 minutes. The reaction is allowed to settle over night, the top solution is siphoned and the solids are washed and dried.

A Pt-shell is finally created by a heat treatment, whereby the powder is transferred into a furnace and heated under nitrogen for 1 hour at 300° C. After the annealing, $ZrO_2$/Pt core/shell particles are obtained with a thin shell of platinum with 4 nm thickness.

Particle Characteristics:

| | |
|---|---|
| Medium diameter of $ZrO_2$ core particles (by TEM): | 80 nm |
| Medium diameter of $ZrO_2$/Pt particles (by TEM) | 88 nm |
| Medium thickness of Pt shell ($t_{shell}$) | ~4.0 nm |
| Medium thickness of Pt shell (in % of $d_{core}$) | ~5% |
| Mass reduction Pt compared to 100% Pt | ~75% | c) Preparation of Supported $ZrO_2$/Pt Core/Shell-Particles 27 g of carbon black (Ketjen Black EC300J; Akzo) are dispersed in 2 liter of deionised water using a high speed stirrer. The dispersion is then heated to 50° C. under continuous stirring. The pH of the dispersion is adjusted to pH 5 using nitric acid. Now, 9 g of the $ZrO_2$/Pt core/shell particles prepared according to Example 6b) are dispersed in 1 liter of deionised (DI) water. This dispersion is then added dropwise to the suspension of the carbon black. After the addition is completed, the mixture is further stirred at 50° C. for 3 hours. After cooling, the solids are allowed to settle over night. The solids are then filtered off, washed and dried. The $ZrO_2$/Pt core/shell particles are well dispersed on the carbon black surface, forming a $ZrO_2$/Pt/C catalyst with a 30 wt.-% catalyst particle loading.

EXAMPLE 7

Preparation of $ZrO_2$/Pt Core-Shell Particles (40 nm $ZrO_2$ Cores)

The nano-zirconia is obtained from Sumitomo Osaka Cement Co. Ltd. (Tokyo, Japan) in form of a 10 wt.-% dispersion with a medium particle diameter of 40 nm.

50 ml of the nano-zirconia dispersion is diluted in 1 liter of deionized (DI) water in a 5 liter beaker. The solution is adjusted to 4 liter with deionized (DI) water and 9.31 g Pt as hexachloroplatinic-(IV)-acid (25 wt.-% Pt; 37.24 g; Umicore Hanau/Germany) is added and stirred for 10 minutes to insure complete dissolution. The solution is then heated to 40° C. and 67.0 g of solid ascorbic acid (Merck) is added under constant mixing. The solution is further heated to 70° C. and kept there for 100 minutes. The reaction is allowed to settle over night, the top solution is siphoned and the solids are washed and dried.

The Pt-shell is finally created by a heat treatment, whereby the powder is transferred into a furnace and heated under nitrogen for 1 hour at 300° C. After the annealing, $ZrO_2$/Pt core/shell particles are obtained with a thin shell of platinum of 3 nm thickness.

Particle Characteristics:

| | |
|---|---|
| Medium diameter of $ZrO_2$ core particles (by TEM): | 40 nm |
| Medium diameter of $ZrO_2$/Pt particles (by TEM) | 46 nm |
| Medium thickness of Pt shell ($t_{shell}$) | ~3.0 nm |
| Medium thickness of Pt shell (in % of $d_{core}$) | ~7.5% |
| Mass reduction Pt compared to 100% Pt | ~65% |

EXAMPLE 8 a) Preparation of Ce/$ZrO_2$ Core-Particles

Nano-scaled, ceria-doped zirconia is obtained by slow hydrolysis according to the method described by H. Yuexiang and G. Cun-ji (Powder Technology 1992, 72, 101-104).

18.25 g of Zr as zirconylchlorid-octahydrate ($ZrOCl_2 \times 8 H_2O$) is dissolved in 1 liter of deionised (DI) water in a 3-necked beaker. Next, 910 mg of Ce as cerium (III) acetate are added and also dissolved. Finally, 12.01 g of urea are dissolved in the solution of $ZrOCl_2$ and $Ce(NO_3)_3$. After complete dissolution of the urea, the mixture is heated under reflux for 50 hours. After cooling down to room temperature, the reaction solution is transferred to a dialysis tube to purify the mother liquor from excess of chloride. The dialysis tube is placed in a beaker with 5 liter of deionised (DI) water and the water is exchanged three times within three days. The Ce/$ZrO_2$ particles are then separated and washed with ethanol to remove water and finally dried in vacuum.

Analysis of the Ce/$ZrO_2$-particles by TEM shows deagglomerated, spherical particles with a medium diameter of 80 nm.

b) Preparation of Ce/$ZrO_2$/Pt Core-Shell Particles

The ceria/zirconia particles prepared according to Example 8a) are used without drying after purification. A portion of 5 g of the purified particles as dispersion is transferred into a 5 liter beaker. The dispersion is adjusted to 3 liter with deionised (DI) water and 5.92 g Pt as hexachloroplatinic-(IV)-acid (25 wt.-%; Umicore Hanau/Germany) is added and stirred for 10 minutes to obtain complete dissolution. The solution is then heated to 40° C. and 43 g of solid ascorbic acid (Merck) is added under constant stirring. The solution is further heated to 70° C. and kept there for 100 minutes. The reaction is allowed to settle over night, the top solution is siphoned off and the solids are washed and dried.

The Pt shell is finally created by a heat treatment, wherein the powder is transferred into a furnace and heated under nitrogen for 1 hour at 300° C. After the annealing, Ce/$ZrO_2$/Pt core/shell particles are obtained with a thin shell of platinum of about 4 nm thickness.

Particle Characteristics:

| | |
|---|---|
| Medium diameter of Ce/$ZrO_2$ core particles (by TEM): | 80 nm |
| Medium diameter of Ce/$ZrO_2$/Pt particles (by TEM) | 88 nm |
| Medium thickness of Pt shell ($t_{shell}$) | ~4.0 nm |
| Medium thickness of Pt shell (in % of $d_{core}$) | ~5% |
| Mass reduction Pt compared to 100% Pt | ~75% |

The invention claimed is:

1. Catalyst particles comprising a core/shell structure of $M_{core}/M_{shell}$ wherein
   $M_{core}$ = material of inner particle core, and
   $M_{shell}$ = material of outer particle shell
   wherein said catalyst particles have a medium diameter ($d_{core+shell}$) in the range of 20 to 100 nm,
   wherein the thickness of the outer particle shell ($t_{shell}$) is about 5 to 20% of the diameter of the inner particle core ($d_{core}$): $t_{shell}$=~0.05 to 0.2 $d_{core}$;
   wherein $t_{shell}=(d_{core+shell}-d_{core})/2$;
   and wherein the material of the inner particle core ($M_{core}$) comprises a ceramic material and the material of the outer particle shell ($M_{shell}$) comprises at least 3 atomic layers, and consists essentially of a precious metal, a precious metal alloy or mixtures thereof.

2. The catalyst particles according to claim 1, wherein the ceramic material is selected from the group consisting of inorganic oxides, inorganic nitrides, mixed inorganic oxides, perowskites, spinels, stabilized inorganic oxides and doped inorganic oxides and mixtures or combinations thereof.

3. The catalyst particles according to claim 1, wherein the ceramic material comprises alumina ($Al_2O_3$), zirconia ($ZrO_2$), titania ($TiO_2$), tin dioxide ($SnO_2$), ceria (e.g. $Ce_2O_3$ and/or $CeO_2$), $MgO/SiO_2$, $CaO/(Al_2O_3/SiO_2)$, $MgAl_2O_4$ or $CoAl_2O_4$, $Ce/ZrO_2$, $Y_2O_3$—$ZrO_2$, $La_2O_3$—$ZrO_2$ or $SnO_2(F)$.

4. The catalyst particles according to claim 1, wherein the outer particle shell ($M_{shell}$) comprises a precious metal selected from the group consisting of ruthenium (Ru), osmium (Os), rhodium (Rh), iridium (Ir), palladium (Pd), platinum (Pt), silver (Ag), gold (Au) and alloys or mixtures thereof.

5. The catalyst particles according to claim 1, wherein the outer particle shell ($M_{shell}$) comprises an alloy of a precious metal with at least one base metal.

6. A gas-phase catalysis reactor or a catalytic converter for automobiles which comprises the catalyst particles according to claim 1.

7. Electrocatalyst for fuel cells, comprising the catalyst particles according to claim 1, supported on a support material.

8. Electrocatalyst according to claim 7, wherein the support material is an electrically conductive, high surface area carbon black or graphite.

9. Electrocatalyst according to claim 7, wherein the catalyst particle loading on the support material is in the range of 10 to 90 wt.-% based on the total weight of the supported electrocatalyst.

10. Method for manufacture of supported electrocatalysts according to claim 7, wherein the outer particle shell ($M_{shell}$) is applied to the material of the inner particle core ($M_{core}$) in the presence of the support material.

11. Method for manufacture of the catalyst particles according to claim 1, wherein the outer particle shell ($M_{shell}$) is applied to the core material ($M_{core}$) by wet chemical reduction methods.

12. Method according to claim 11, wherein the outer particle shell ($M_{shell}$) is applied by deposition of precious metal particles from a colloidal dispersion.

13. Method according to claim 11, further comprising a heat treatment step at temperatures in the range of 200 to 500° C. for 0.5 to 2 hours.

14. Method according to claim 11, further comprising a supporting step on a suitable support material.

15. Method for manufacture of the catalyst particles according to claim 1, wherein the outer particle shell ($M_{shell}$) is applied to the core material ($M_{core}$) by electroplating, cementation, transmetallation, under potential deposition (UPD), plasma coating, vapour deposition, physical vapour deposition (PVD), chemical vapour deposition (CVD) or atomic layer deposition (ALD).

16. The catalyst particles according to claim 1, wherein the medium diameter is in the range of 20 to 50 nm.

17. The catalyst particles according to claim 1, wherein the outer particle shell ($M_{shell}$) consists essentially of platinum or a platinum based alloy.

* * * * *